United States Patent [19]
Vine

[11] Patent Number: 5,757,996
[45] Date of Patent: May 26, 1998

[54] OPTICAL FIBRE CONNECTOR WITH MOVEABLE INSERT

[75] Inventor: Raymond George Vine, Sussex, United Kingdom

[73] Assignee: Deutsch Limited, West Sussex, United Kingdom

[21] Appl. No.: 701,089

[22] Filed: Aug. 21, 1996

[30] Foreign Application Priority Data

Mar. 22, 1996 [GB] United Kingdom ............... 9606027

[51] Int. Cl.⁶ ............................................. G02B 6/38
[52] U.S. Cl. ............................................. 385/59
[58] Field of Search ...................... 385/59, 53, 71, 385/88–92, 141

[56] References Cited

U.S. PATENT DOCUMENTS

| | | | |
|---|---|---|---|
| 5,386,486 | 1/1995 | Fan et al. | 385/71 |
| 5,528,711 | 6/1996 | Iwano et al. | 385/55 X |
| 5,557,696 | 9/1996 | Stein | 385/67 X |

FOREIGN PATENT DOCUMENTS

| | | |
|---|---|---|
| 53-21744 | 2/1978 | Japan . |
| 53-21746 | 2/1978 | Japan . |
| 53-21883 | 2/1978 | Japan . |

*Primary Examiner*—Akm E. Ullah
*Attorney, Agent, or Firm*—Fish & Richardson P.C.

[57] ABSTRACT

An optical fiber connector includes moveable sleeve means allowing female contact members to be accessed for cleaning. The moveable sleeve is permanently retained attached to the connector body. Its movement between two positions is controlled by an alignment rod on which in a second position the sleeve is rotatable to allow access to the optical contacts.

12 Claims, 3 Drawing Sheets

OPTICAL FIBRE CONNECTOR WITH MOVEABLE INSERT

The present invention relates to optical fibre connectors and more particularly to high performance optical fibre connectors which use the pin and socket principle of contact where the socket contact member is used to provide the prime method of alignment between two optical fibres.

When connectors of this type are mated there is invariably an unprotected cavity in all the socket contacts when the connectors and the contacts are in the unmated condition.

This is a common situation in all multiway pin and socket electrical contacts but contamination within the socket contact of an electrical connector is not catastrophic since electrical contact is made along the pin and socket contacts.

In the case of an optical contact however the performance of the connector is dependent on the cleanliness of the end faces of the optical contacts because in the fully mated condition of the connectors the end faces of the contacts must butt with one another.

Even small pieces of grit can result in the end faces of the contacts being separated thereby diminishing the performance of the connector.

If an optical socket contact is based upon the recognised military standard of electrical contact and incorporated in a standard electrical connector body, with or without additional electrical contacts, conforming to Mil standards then it is exceedingly difficult, if not impossible, to clean the optical face of a contact because it will be recessed in the socket contact.

The present invention seeks to overcome this problem by providing a removable front insert in the connector which on removal exposes the optical face of the contact or contacts and enables them to be cleaned.

There is, however, a further problem associated with the provision of a removable front insert which is that the front insert in a preferred design forms part of the alignment means comprising one or more alignment sleeves for the optical contact. If the front insert is removed then it may, especially in field conditions, become lost. In such cases the connector will not be usable since the alignment will be inaccurate without the insert.

Additionally, even if the insert is retained it can be inserted incorrectly; possibly not fully "home" and this can also result in deterioration in connector performance.

The present invention overcomes the above disadvantages.

The present invention provides an optical fibre connector comprising in a first half of the connector one or more optical fibres located within a connector body and being provided with end contact faces for mating with optical fibres in a second mating half of the connector, alignment means associated with each end contact face, in which the alignment means comprises a moveable insert which is moveable from a first position to a second position away from the optical contact faces to allow access to the faces for cleaning of each optical face and in which the removable insert comprises means for constraining its movement so as to be not detachable from the first half of the connector.

Preferably the means for constraining the movement of the moveable insert comprises guidance rod means.

Preferably the guidance rod means is slidably mounted in the first half of the connector.

Preferably the slidable rod means in the second position is rotatably mounted to allow the moveable insert to rotate allowing easier access to the optical contacts.

Preferably the slidable rod means comprises first stop means for securing the moveable insert in the first position.

Preferably the slidable rod means also comprises second stop means for securing the moveable insert in the second position.

Preferably both the first and second stop means cooperate with a cooperate locking member situated within the first part of the connector.

Preferably the cooperative locking member allows the guidance rod to rotate in the second position of the moveable insert.

BRIEF DESCRIPTION OF THE DRAWINGS

Embodiments of the present invention will now be described, by way of example with reference to the accompanying drawings in which.

Figure 1A:
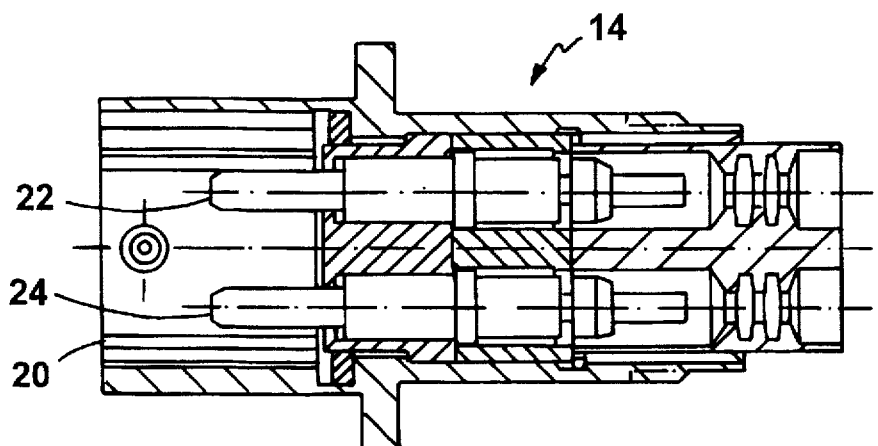
FIG. 1 shows in cross-section a connector according to the present invention with the moveable insert in its connector operating position FIG. 1a) showing the second part of the connector FIG. 1b) showing the first part with moveable insert.
FIG. 1c) showing an elevation of b) illustrating the guidance pin FIG. 2(a–c) shows the connector of FIG. 1(b) illustrating the moveable insert in a second position.
Figure 2A:
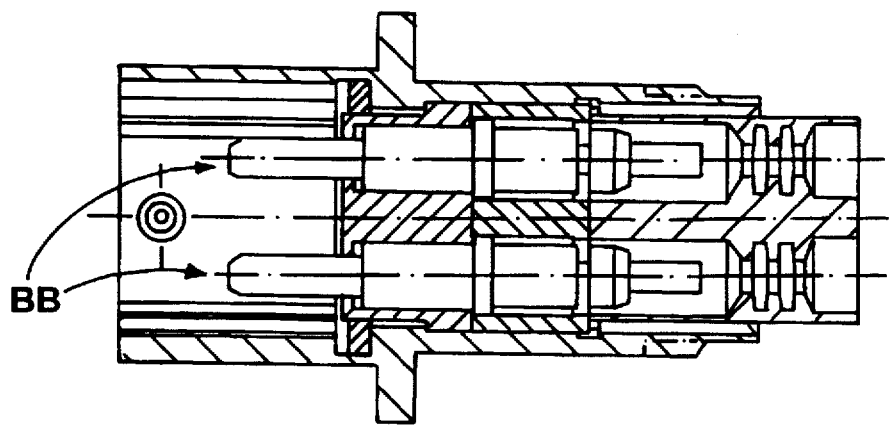
Figure 3A:
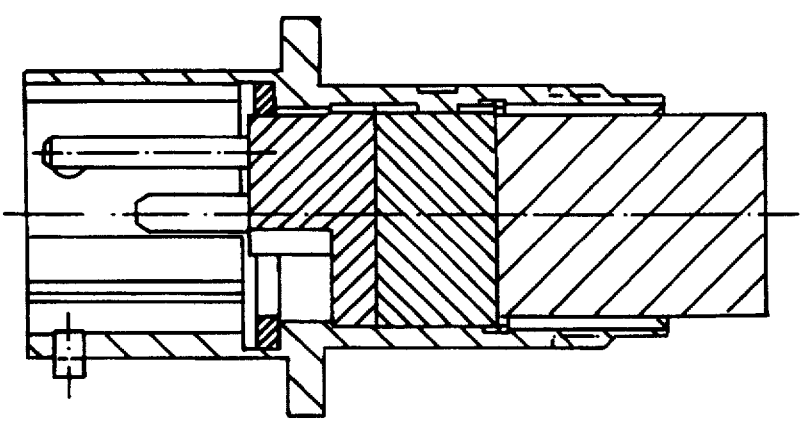
FIG. 3(a–c) shows the connector of FIG. 1 illustrating the moveable insert in a third position.

With reference now to the drawings, the connector 10 comprises first and second parts 12,14 which in known manner form the mateable connector.

The first part 12 may be considered to be the male plug portion and the second part 14 the female receptacle portion.

The two portions are connectable in known manner by, for example, a threaded ring 16 and are aligned by means of alignment keys and key ways 18,20 also in known manner. This type of connector body conforming to Mil standards is well known and will not therefore be further described.

The second part 14 of the connector includes two optical fibre contacts 22,24 connected to an optical fibre cable (not shown) in known manner. The ends of the optical fibres are of very small diameter and therefore accurate alignment with the other half of the connector is essential. Also it is essential for the optical fibre ends to closely abut each other or light dispersion will occur thereby decreasing the efficiency of the connector.

To achieve correct alignment the first part of the connector 12 comprises a co-operating optical fibre end contacts 26,28 which are aligned within an alignment sleeve insert 30 comprising two alignment sleeves 32,34.

In operation contacts 22,24 of the second part are guided down alignment sleeves 32;34 in alignment sleeve insert 30 to optically mate with contacts 26,28.

However, the connector is designed for and may be used in hostile environments and grit (or dirt) may become lodged within alignment sleeve holes 32,34 and may become attached to optical faces 26 or 28. This is most undesirable since if the connector is mated it will function inefficiently on mating and the grit if forced into the end of the optical fibre will permanently damage it.

For these reasons it is important to be able to clean the ends of the optical fibres.

The ends of the fibres 22,24 are accessible and easily cleaned but not those of fibres 26,28.

Figure 2B:
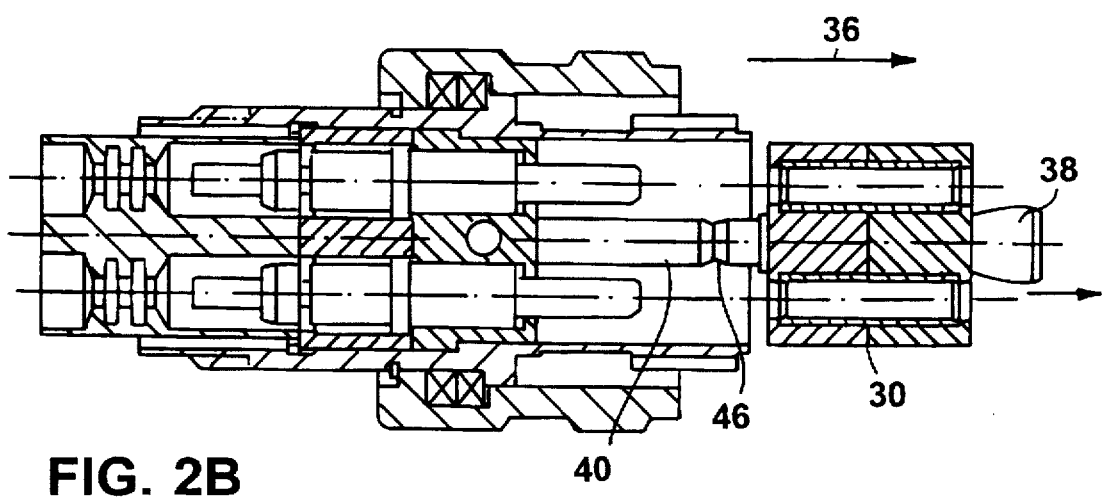

To enable the ends of fibres 26,28 to be cleaned alignment sleeve 30 is moveable in the direction of arrow 36 to the position shown in FIG. 2b. To enable insert 30 to be moved a small knob 38 is provided. This knob is preferably attached to the end of an alignment rod 40 which supports and aligns insert 30. The alignment rod 40 is journalled in bearing surfaces 42,44 in the body of the connector.

Figure 1B:
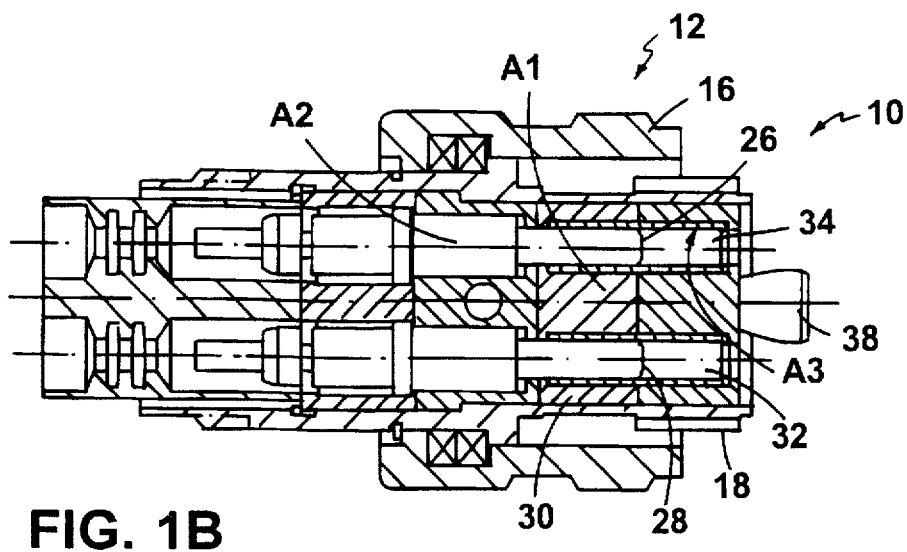

The rod 40 is slidable from its first position shown in FIG. 1(b) to a second position shown in FIG. 2(b). At each position indented portions 46,48 hold the rod 40 in position by cooperation with spring loaded ball means 50.

Figure 3B:
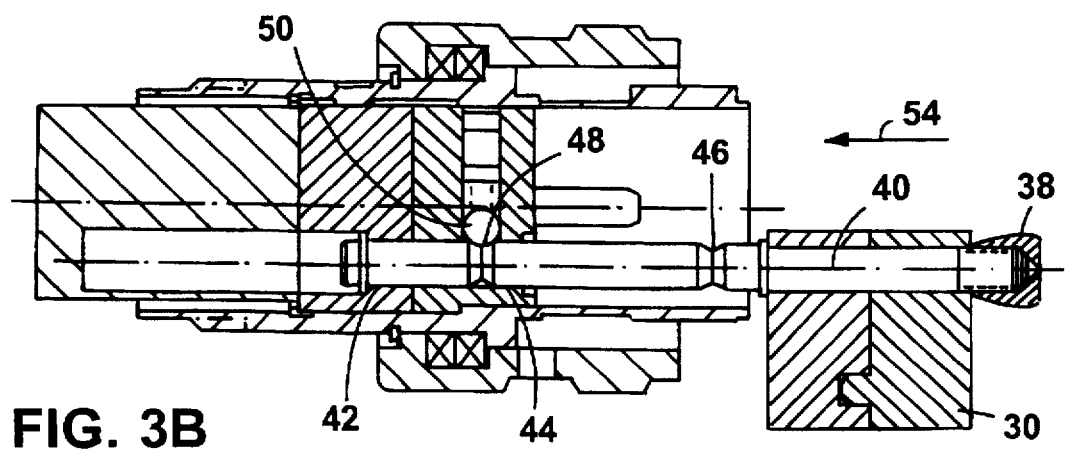
Figure 1C:
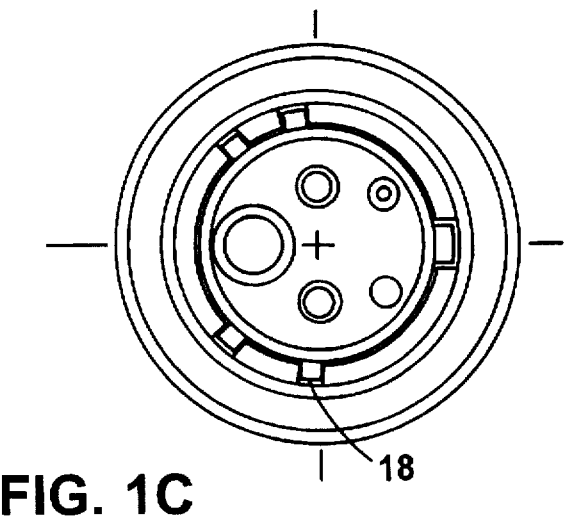
Figure 2C:
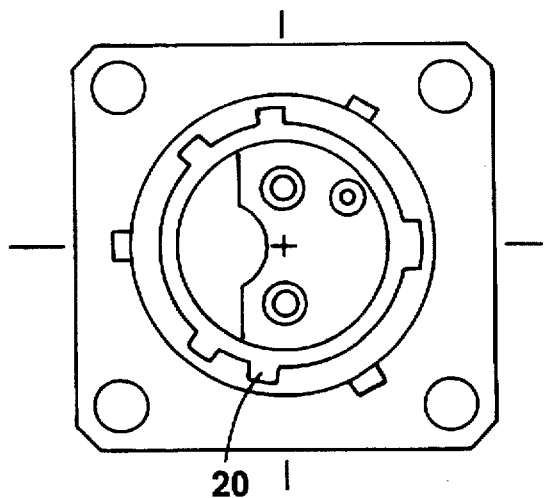
Figure 3C:
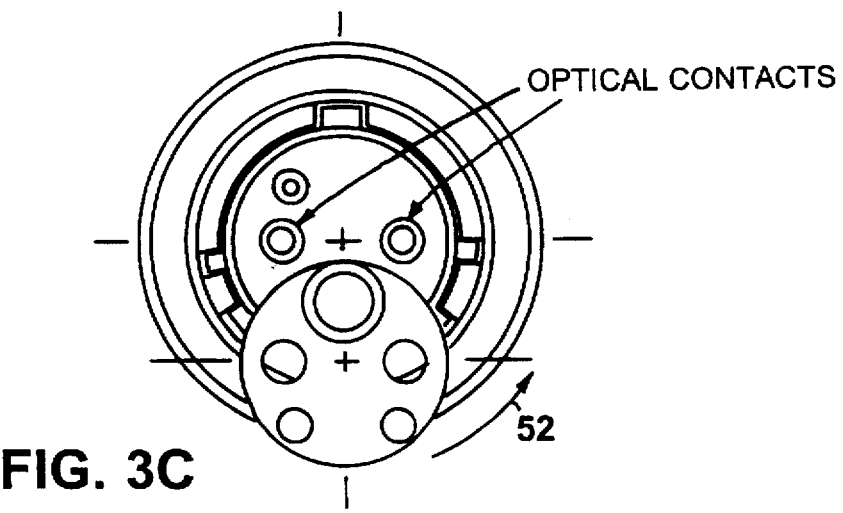

In the second position shown in FIG. 2(b) the insert 30 is clear of the main body 12 of the connector. The insert 30 can then be rotated as shown in FIG. 3b and 3c to move away from the contacts 26,28 enabling them to be cleaned.

After cleaning reassembly is extremely easy with two simple movements. Firstly, rotating insert 30 into alignment with the connector as indicated by arrow 52 (FIG. 3c) and then pushing insert 30 back into the connector body as indicated by arrow 54 (FIG. 3b). The stop means 46,50 enables the operator to readily ensure that the sleeve is inserted to the correct position.

The advantages of the connector are very substantial. The ease of removal of insert 30 means that the connectors optical contact surfaces will be regularly cleaned since it is extremely easy to move insert 30 rotate it out of the way and then reinsert it. The insert cannot be lost and the connector can be cleaned even in the dark since the stop means 46,48 make it easy to detect when the sleeve is in both positions. This can be done by feel as the stops are encountered and by a clicking noise as the ball enters the indent.

The sleeve cannot be lost. Also it cannot be misaligned or put in backwards. Because it cannot be dropped it cannot itself become dirty which would otherwise be possible. Thus the optical contacts once wiped will remain clean on reinsertion of the alignment sleeve insert.

It is possible to include one or more electrical contacts within the connector in addition to the optical contacts.

I claim:

1. An optical fibre connector comprising in a first half of the connector one or more optical fibres located within a connector body having a longitudinal axis, said optical fibres being provided with end contact faces for mating with optical fibres in a second mating half of the connector, alignment means associated with each end contact face, the alignment means comprising a moveable insert which is moveable in the direction of the longitudinal axis of the connector from a first position to a second position away from the optical contact faces to allow access to the faces for cleaning of each optical face, the moveable insert comprising retention means for constraining any substantial further movement of the moveable insert in the direction of the longitudinal axis of the connector away from the optical faces when the moveable insert is in the second position, said retention means thereby ensuring that the moveable insert is not detachable from the first half of the connector and is therefore permanently attached to the first half of the connector.

2. A connector as claimed in claim 1 in which the retention means for constraining the movement of the moveable insert comprises guidance rod means.

3. A connector as claimed in claim 2 in which the guidance rod means is slidably mounted in the first half of the connector.

4. A connector as claimed in claim 3 in which the slidable rod means in the second position is rotatably mounted to allow the moveable insert to rotate allowing easier access to the optical contacts.

5. A connector as claimed in claim 4 in which the slidable rod means comprises first stop means for securing the moveable insert in the first position.

6. A connector as claimed in claim 5 in which the slidable rod means also comprises second stop means for securing the moveable insert in the second position.

7. A connector as claimed in claim 6 in which both the first and second stop means cooperate with a cooperate locking member situated within the first part of the connector.

8. A connector as claimed in claim 7 in which the cooperative locking member allows the guidance rod to rotate in the second position of the moveable insert.

9. An optical fibre connector comprising
in a first half of the connector one or more optical fibres located within a connector body and being provided with end contact faces for mating with optical fibres in a second mating half of the connector,
alignment means associated with each end contact face, the alignment means comprising a moveable insert which is moveable from a first position to a second position away from the optical contact faces to allow access to the faces for cleaning of each optical face, the moveable insert comprising means for constraining its movement so as to be not detachable from the first half of the connector,
the means for constraining the movement of the moveable insert comprising guidance rod means slidably mounted in the first half of the connector, the slidable rod means comprising first stop means for securing the moveable insert in the first position and second stop means for securing the moveable insert in the second position,
the first stop means and the second stop means cooperating with a cooperative locking member situated within the first half of the connector to provide the operator with a positive indication that the moveable insert is in the first position and the second position.

10. An optical fibre connector as claimed in claim 9 in which the cooperative locking member comprises a spring loaded ball mounted in the body of the connector and cooperating indents on the guidance rod means, and in which the positive indication comprises a clicking noise created as said ball enters said indents.

11. An optical fibre connector comprising
in a first half of the connector one or more optical fibres located within a connector body and being provided with end contact faces for mating with optical fibres in a second mating half of the connector,
alignment means associated with each end contact face, the alignment means comprising a moveable insert which is moveable from a first position to a second position away from the optical contact faces to allow access to the faces for cleaning of each optical face, the moveable insert comprising means for constraining its movement so as to be not detachable from the first half of the connector,
the means for constraining the movement of the moveable insert comprising cylindrical guidance rod means which enables the moveable insert to rotate in the second position of the moveable insert from a first angular position to a second angular position thereby to allow clear assess to the optical fibre end contact faces in the first half of the connector to enable cleaning of the end contact faces of the optical fibres, and to allow reverse rotation of the guidance rod to return the moveable insert back to its original position prior to rotation thereby to maintain correct positioning of the moveable insert and enable the moveable insert to be readily moved back from its second position to its first position.

12. A connector as claimed in claim 11 further including first and second stop means on said guidance rod means, said first and second stop means being cooperative with a locking member in said connector body to provide positive engagement of said moveable insert in both said first position and said second position.

* * * * *